Patented Mar. 19, 1946

2,396,994

UNITED STATES PATENT OFFICE 2,396,994

CONDENSATION PRODUCTS OF HYDROXY CARBOXYLIC ACIDS

Edward M. Filachione, Philadelphia, and Charles H. Fisher, Abington, Pa., assignors to United States of America as represented by Claude R. Wickard, Secretary of Agriculture, and his successors in office No Drawing. Application January 18, 1944, Serial No. 518,744

5 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to methods for converting hydroxy carboxylic acids into their condensation products, and particularly to methods for concentrating aqueous solutions of lactic acid and for transforming lactic acid into its condensation products by removal of water.

An object of this invention is to provide a new and useful method for converting hydroxy carboxylic acids into their condensation products.

A further object is to provide a method for accelerating the dehydration of hydroxy acids, such as lactic acid, particularly in the latter stages of the dehydration.

Other objects will appear from the following description.

We have found that condensation products of hydroxy carboxylic acids are obtained very readily by heating the acids in the presence of esterification catalysts at substantially reduced pressures. The dehydration proceeds quite rapidly under these conditions, even in the latter stages of the process. Suitable esterification catalysts are strong acids, such as sulfuric acid, phosphoric acid, hydrogen chloride, perchloric acid, boric acid, and sulfonic acids, or acidic salts, such as zinc chloride, aluminum chloride, boron fluoride, aluminum sulfate, sodium acid sulfate, and potassium acid phosphate.

Our process is particularly advantageous when the dehydrated hydroxy acids are intended for use in preparing hydroxy esters by reaction with alcohols, because the catalysts used in the process may then be left in the condensation product obtained to catalyze the subsequent esterification.

If it is desired to remove the catalyst from the condensation product, this may be done by neutralizing it with a base or other acid neutralizing substances, such as metal oxides, metal hydroxides, carbonates, acetates, ammonia, and so forth. The catalyst may also be removed by washing a solution of the condensation product with an alkaline solution.

Our invention is illustrated by the following examples:

Example I

A mixture of 90 g. of 100 percent lactic acid and 1 g. of p-toluenesulfonic acid monohydrate was heated at a pressure of 20 mm. of mercury. The bath temperature was raised from 100° to 150° C. over a period of approximately 4 hours. The weight of the lactic acid was reduced by 17 g. during this time which was accounted for essentially by loss of water. The very viscous brown residue was a mixture of self-condensation products of lactic acid, commonly referred to as polylactic acid or lactic anhydrides.

Example II

Under a pressure of 25 mm., a mixture of 900 g. of 100 percent lactic acid with 5.0 ml. of concentrated sulfuric acid was dehydrated at a bath temperature not exceeding 110° C. After approximately 10 hours, the removal of water became very slow. The loss in weight due to removal of water was 159 g. The residue was the desired polylactic acid.

Example III

Under a pressure of 20 mm., a mixture of 512 g. of approximately 80 percent lactic acid solution with 5.0 g. of p-toluenesulfonic acid monohydrate was heated at a bath temperature not exceeding 150° C. When the distillation of water ceased or became very slow, the reaction was considered finished. The loss in weight, due mainly to removal of water, was 181 g. The residue was viscous polylactic acid.

Example IV

At a pressure of 17 mm., a mixture of 512 g. of approximately 80 percent aqueous lactic acid with 5 ml. of concentrated sulfuric acid was heated at a bath temperature of 100° to 108° C. until removal of water apparently ceased. The loss in weight, mainly water, was 170 g. The residue was polylactic acid.

Example V

A mixture of 220 g. of approximately 80 percent aqueous lactic acid, 100 ml. of benzene and 1 ml. of concentrated sulfuric acid was refluxed at atmospheric pressure, in an apparatus provided with a Barrett tube which permitted the automatic separation of water from the benzene and return of benzene to the reaction mixture. After approximately 11 hours, removal of water almost ceased. 78 ml. of water was removed with the Barrett tube. The material remaining in the reaction flask was a benzene solution of polylactic acid.

Example VI

A mixture of 220 g. of 80 percent aqueous lactic acid, 100 ml. of benzene, and 2 g. of boric acid was refluxed in apparatus provided with a Barrett tube. After approximately 18 hours, 76 ml. of water collected in the Barrett tube. The material in the reaction flask was a benzene solution of polylactic acid.

*Example VII*

A mixture of 220 g. of approximately 80 percent aqueous lactic acid and 5 g. of boric acid was heated at a pressure of 18 to 25 mm. at a bath temperature not exceeding 142° C. After 2.5 hours 72 g. of condensate, mainly water, was collected. The residual polylactic acid was a very viscous, almost solid, pale yellow mass.

The removal of water as the reaction proceeds can be facilitated by the use of an entraining agent. Examples V and VI illustrate the use of benzene for this purpose, and hydrocarbons in general will give good results. Other suitable entraining agents are halogenated hydrocarbons, organic esters, ethers, halogenated ethers and ketones.

Having thus described our invention, we claim:

1. The process which comprises dehydrating lactic acid in the presence of a strong mineral acid catalyst in the absence of alcohols.

2. The process of forming condensation products of lactic acid which comprises heating said acid in the presence of a strong mineral acid catalyst and a suitable entraining agent in the absence of alcohols and distilling water and the entraining agent from the reaction mixture.

3. The process of forming condensation products of lactic acid which comprises heating said acid in the presence of a strong mineral acid catalyst and a suitable entraining agent at a substantially reduced pressure in the absence of alcohols and distilling water and the entraining agent from the reaction mixture.

4. The process of forming condensation products of lactic acid which comprises heating said acid in the presence of sulfuric acid and a suitable entraining agent at a substantially reduced pressure in the absence of alcohols, and distilling water and the entraining agent from the reaction mixture.

5. A composition of matter suitable for conversion into alkyl lactates comprising a mixture of lactic acid condensation products and a strong mineral acid, the latter being present in at least catalytic amounts.

EDWARD M. FILACHIONE.
CHARLES H. FISHER.